United States Patent Office 3,368,865
Patented Feb. 13, 1968

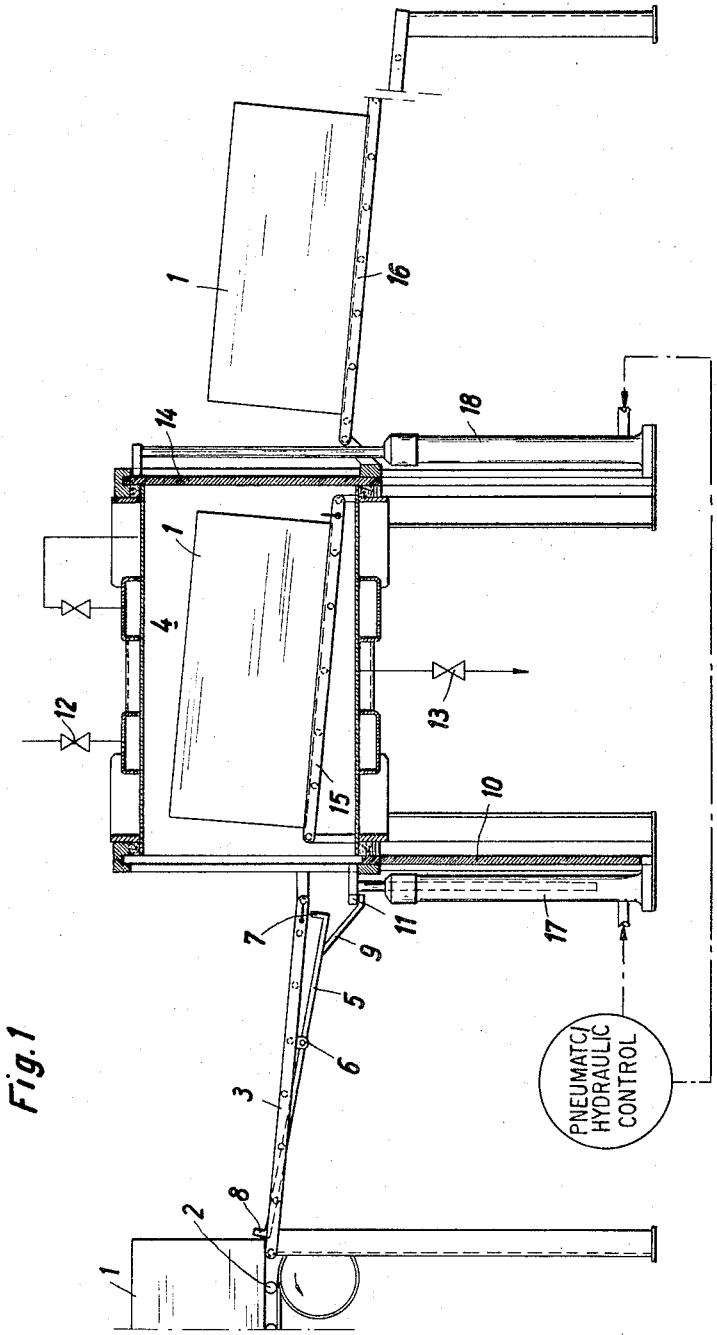

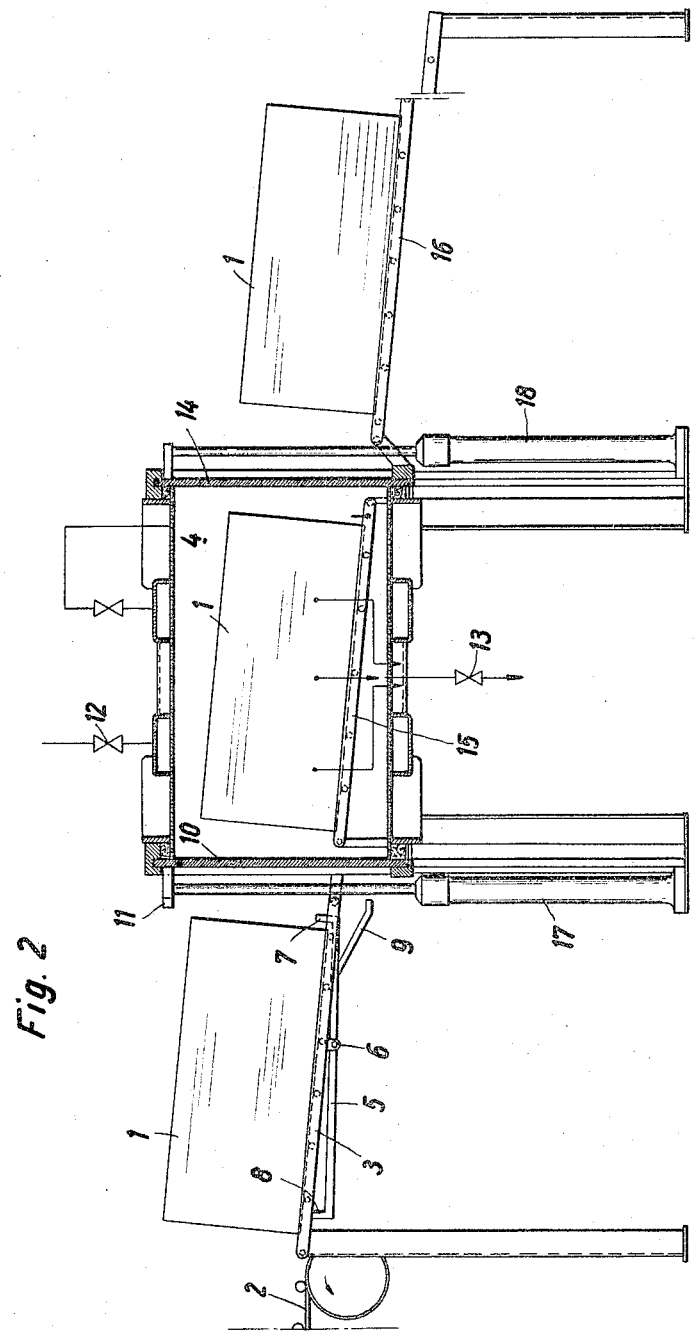

3,368,865
APPARATUS FOR THE SEQUENTIAL STERILIZATION OF ARTICLES IN RECEPTACLES
Ludwig Josef Schuck, Bacham, near Prien, Germany, assignor to Rud. A. Hartmann Gross-Apparate und Spezialmaschinen G.m.b.H. & Co., Berlin, Germany
Filed Dec. 17, 1963, Ser. No. 331,292
Claims priority, application Germany, Dec. 17, 1962,
H 47,714
3 Claims. (Cl. 21—96)

ABSTRACT OF THE DISCLOSURE

Apparatus for the sequential sterilization of receptacles containing an assortment of articles to be sterilized wherein a downwardly inclined roller conveyor delivers the receptacles in succession to a further roller conveyor in an autoclave whose entrance door is coupled with a detent lever at the input conveyor to alternately immobilize the receptacles and admit them in succession to the sterilization chamber upon opening and closing of the entrance door.

---

This invention relates to an apparatus for continuously sterilizing various articles such as may be used in large institutions, particularly in hospitals.

Apparatuses are already known for sterilizing or pasteurizing industrially produced goods, for example goods packed in bottles or cans. Such sterilization or pasteurization is effected without pressure. The products to be treated pass through open containers in which they are brought to the necessary temperature and then cooled. Continuous operation with equipment of this type and utilizing intrinsically known conveyor belts presents no difficulty.

Known apparatus of this type cannot be used for sterilization in a large institution particularly in a hospital. Sterilization of the various products in this case, for example patients' linen, medical appliances, ampoules, and the like, must be effected under a pressure of 2–3 atmospheres above atmospheric. Sterilization is therefore effected in boiler-like sterilizers or autoclaves which can be closed in a pressure-tight manner. Because of the differing products, in such large institutions sterilizing vessels of different sizes have hitherto been required. These sterilizers must be operated by suitable personnel, by whom the sterilizing vessels must be opened for the purpose of introducing the container holding the products to be sterilized, and closed the unit in a pressure-tight manner. After sterilization has been effected the vessel must be opened again in order to enable the container holding the sterilized products to be removed. Personnel necessary for operating these sterilizers are exposed during the operation to the risk of physical injury from the containers, which are at a high temperature.

The object of the invention is to make a considerable saving in operating personnel as compared with known equipment, to eliminate the danger of injury, and to provide for the sterilization of various hospital articles of the type mentioned, an apparatus which works continuously with simple means and the lowest possible cost.

The invention is characterized in that containers of the same size, which pass in succession through a sterilizing chamber working at a pressure of over 2 atmospheres above atmospheric are used for all the products concerned; the individual containers are deposited, preferably by an intrinsically known conveyor device, on a roller bed directed obliquely downwards and having a retaining means, the latter releasing the container standing on the roller bed when the admission door to the sterilization chamber reaches the open position. After entering the chamber the container is held fast by a braking or retaining means, and on completion of sterilization the braking or retaining means is released after reaching the open position of the outlet door. The use according to the invention of containers of a single size necessitates the presence of only a single sterilizer, as compared with the sterilizers of different sizes which were hitherto considered necessary. Owing to the fact that the sterilization takes place continuously, a saving of time is achieved as compared with known equipment. The sterilization operation is composed of air evacuation, steam sterilization, exhaustion by suction, and drying. Through suitable design of the evacuation pump required for the exhaustion, the actual exhaustion operation can be carried out at high speed, thus achieving a further saving of time. The construction of the sterilizing vessel according to the invention, together with its obliquely directed roller beds serving for entry and discharge, makes the personnel hitherto required for operation unnecessary, since the containers filled with the articles to be sterilized are automatically delivered continuously one after the other to the sterilizer, their advance being regulated by the retaining means disposed according to the invention on the roller bed, which is provided in front of the sterilizer, and in the sterilizer itself.

According to the invention the retaining means on the roller bed serving for admission is constructed as a lever adapted to rock about a fulcrum situated in the region of its middle, this lever carrying at its two ends upwardly directed holding noses and being provided at its end facing the entry door of the sterilization chamber with a stop coming into engagement with the upper edge of the door. When the admission door is closed, a sterilizing container is held fast in position on the roller bed by the front retaining nose of the lever. When the admission door drops on completion of a sterilization operation, the retaining nose is moved downwards and the sterilizing container is freed, so that under the action of gravity it then runs into the sterilizing vessel.

The base of the sterilizing chamber itself is likewise constructed as a roller bed inclined downwardly. The braking or retaining means disposed on the roller bed may be of a construction similar to the retaining means situated on the roller bed lying in front of that of the sterilizing vessel. This braking or retaining means situated in the sterilization chamber is released by the outlet door so that on completion of the sterilization operation the container can roll out of the vessel under the action of gravity and thence be delivered on to a conveyor belt which attends to its further transport.

Another feature of the invention consists in that a compressed-air pipe, which can for example be closed by a valve, leads into the sterilization chamber, the latter being provided with an intrinsically known cooling device consisting of a nozzle combination, through which the cooling medium, for example water, is sprayed on to the objects to be cooled, such as plastic bags, bottles, and the like. Through the compressed air source and cooling device provided according to the invention in the sterilization chamber it is possible in the apparatus for continuous sterilization according to the invention to sterilize rapidly and dependably, without damage, articles which are contained in plastic bags or thin-walled bottles. Plastic bags filled for example with preserved blood are generally heated with superheated steam, while the sterile bags are cooled in a short space of time by spraying with cooling liquid. This results in a condensation of the steam and hence a considerable negative pressure in the closed chamber. By the introduction of compressed air before spraying with the cooling liquid, the compressed air source maintains in the sterilization chamber a supporting pressure by which the plastic bags are prevented from bursting and the bottles from cracking. Plastic bags or thin-walled bottles will withstand an external superatmospheric pressure, but are relatively sensitive to an external sub-atmospheric pressure. Moreover, because of the heating to about 130° C. the plastic bags become soft during the sterilization and readily tend to burst if a sub-atmospheric pressure occurs in the sterilization chamber.

In order to assure the continuity of the sterilization operation with the successive containers, according to the invention the conveyor devices, the chamber doors, the introduction and the discharge of the steam necessary for the sterilization, the operation of the compressed air pipe and of the cooling device are automatically controlled by intrinsically known means, while the latter can be adjusted to the values necessary for the respective products to be sterilized. Through the intrinsically known control equipment provided according to the invention the effect is achieved that the sterilization proceeds automatically and continuously, with the least possible intervention by personnel, in such a manner that in a continuous operation the containers arriving in front of the sterilization chamber are sterilized in immediate succession one after the other, whereby a considerable saving of time is achieved as compared with the known method, while in addition the personnel required is reduced to the minimum possible without being exposed to any danger of personal injury.

The equipment according to the invention works as follows:

The container filled with the products to be sterilized is passed by means of an intrinsically known conveyor device on to the downwardly directed roller bed, where it is held in position by the front nose of the retaining means. On the opening of the admission door of the sterilizer the retaining means is moved downwards, so that the container rolls under the action of gravity into the chamber, where it is again fixed in position by a second braking or holding device, which may be of similar construction to the first-mentioned retaining device. The door is thereupon closed on the admission side. The rear retaining nose of the retaining means of the front roller bed is moved upwards on the opening of the door, so that a second container cannot pass on to the roller bed. When the admission door is closed, the rear retaining nose drops downwards and the front retaining nose moves upwards, so that another container is delivered by the conveyor belt on to the roller bed, where once again it is fixed in position by the front retaining nose. After the closing of the two doors of the sterilizer the usual sterilization process proceeds. On completion of sterilization, the door on the outlet side opens, while in a similar manner to that described for the front roller bed the braking or retaining means is brought out of engagement with the container situated in the sterilizer, so that the container rolls outwards on the likewise inclined roller bed provided in the sterilizer, whence it can be transferred to a conveyor belt. The conveyor belt disposed on the admission side is advantageously so constructed that at its end it has a storage section on which a plurality of containers can be received and from which the individual containers are discharged in succession and in rhythm with the sterilization onto the inclined admission roller bed of the sterilizer. In order to achieve rapid charging and discharging of the sterilization chamber, the doors, one of which is situated on the side at which the products to be sterilized are admitted and the other on the discharge side, are operated by a hydraulic system. This hydraulic system consists of driving cylinders in which a piston is contained which receives its impulses from magnetic valves through a contact mechanism. The piston is fastened on a piston rod, which in turn is mounted on the actual closure door. When pressure is applied to the lower side of the driving cylinder the door is pushed through a piston rod in the upward direction as far as it will go and hence the sterilizer is closed. On the outlet side the same operation takes place. In this way the doors may be controlled in rhythm with the sterilization operation.

The operation is started by placing the first container on the inclined surface of the roller bed on the admission side. After the opening of the admission door the container rolls by the force of gravity into the chamber and after the closing of the door is there treated in the conventional manner with vacuum and steam. When the treatment is completed, the discharge side is opened in the same manner by hydraulic control and the container rolls out of the chamber.

The necessary seal is provided by a flexible tube which lies in guide grooves and after closure is inflated, for example with water, the pressure being so adjusted that it will resist the counter pressure of the steam or vacuum existing in the interior of chamber during the sterilization.

The equipment according to the invention is a continuously working installation, although the sterilization operation inside the chamber is carried out intermittently. In front of the sterilizer a packing table is installed on which the empty containers are filled by the nursing staff with bandages, swabs, and linen. After this operation the packed containers are placed in a continuous operation on the inclined plane, where they will remain until they are automatically admitted into the sterilizer. The storage section provided in front of the entry into the sterilizer is in the form of a roller bed and of such dimensions that it can receive the number of containers which are packed during the sterilization operation, which requires only a period of about 8 minutes. The same occurs on the discharge side.

Another advantage of the apparatus according to the invention consists in the use of a sterilization chamber of uniform size for all purposes. The sterilization chamber is intended to receive a container of uniform size. In sterilizers hitherto used for such purposes four chambers of different size, depending on requirements in each particular case, were necessary. Through the continuous operation of the apparatus according to the invention it is possible to manage with a sterilization chamber of smaller capacity even in institutions where requirements are extensive, so that the apparatus according to the invention can be used for smaller, medium-sized, and large hospitals in exactly the same way.

One embodiment of the invention is illustrated as an example in the accompanying drawings, in which:

FIGURE 1 shows diagrammatically a front elevation of the apparatus according to the invention with the admission door open, and FIGURE 2 a similar view to that in FIGURE 1, with the doors closed.

The containers 1 holding the goods to be sterilized are fed by any type of conveyor belt 2 to a downwardly inclined roller bed 3 disposed in front of the sterilization chamber 4. The roller bed 3 is provided with a rocking lever 5 which is rotatable about the fulcrum point 6 and by its weight is brought into the position shown in FIGURE 2. The lever 5 has a front retaining nose 7 and a rear retaining nose 8. At its front end it also carries a stop 9. In the position illustrated in FIGURE 2, the container 1 is held fast on the roller bed 5 by the nose 7 of the rocking lever 5. When the admission door 10 of the sterilization chamber is lowered, the nose 11 situated at the front end of the door 10 comes into engagement with the stop 9 and entrains the lever 5 downwards into the position shown in FIGURE 1. The container 1 is thus freed and rolls on the bed 5 into the chamber 4, where it is fixed in the chamber in the position shown in FIGURE 2 by a similar retaining device (not illustrated). When the door 10 then closes, the stop 9 is released so that the lever 5 rocks out of the position shown in FIGURE 1 into the position shown in FIGURE 2. The nose 8, which in the position shown in FIGURE 1 projects into the transport path and prevents the transfer of a following container 1 to the roller bed 3, is thereby moved downwards into the position shown in FIGURE 2, so that the next container 1 can pass on to the roller bed, as shown in FIGURE 2. The sterilization operation takes place in the usual manner in the sterilization chamber, with the doors closed. The steam necessary for sterilization is fed through the aperture 12 at a pressure of 2–3 atmospheres above atmospheric, while the condensate passes out through the aperture 13. When the sterilization operation is completed, the door 14 is opened in the downward direction, while the retaining means (not shown) situated in the sterilization chamber is caused by a stop (not shown) corresponding to the stop 11, to free the container 1 situated in the chamber 4, so that said container can roll over the inclined roller bed 15 of the chamber through the action of gravity on to the conveyor belt 16. The door 14 is thereupon closed and the door 10 opened, whereupon a new container 1 automatically enters the chamber 4 and is sterilized by the same process. The front door 10 is operated by a pneumatic cylinder 17, which raises and lowers the door 10. The same is done by a pneumatic or hydraulic cylinder 18 for the door 14.

Sealing tubes (not shown in the drawing) are inserted in the guide grooves of the doors 10 and 14, and after the door has been closed are inflated pneumatically or hydraulically to the necessary sealing pressure. Before the doors are opened the pressure is removed from the sealing hoses, so that the doors can move freely.

The operation of the cylinders 17 and 18 and hence of the doors 10 and 14 and of the retaining devices, and also the regulation of the supply of steam, of evacuation, and of drying are effected through a suitable control means (likewise not illustrated) which is known in itself and which can be adjusted to the values necessary for the respective sterilization operation.

I claim:

1. An apparatus for the sequential sterilization of an assortment of articles receivable in a sequence of generally similar receptacles, said apparatus comprising:

a pressure-retentive sterilization chamber open on opposite entrance and exit sides and adapted to receive said receptacles individually in sequence;

respective doors sealingly closing the open entrance and exit sides of said receptacles and respectively shiftable between open and closed positions to permit said receptacles to be inserted in and removed from said chamber and to seal said chamber for sterilization of said articles in a receptacle confined in said chamber;

means for subjecting articles in a receptacle confined in said chamber to an elevated sterilization temperature and pressure;

a roller conveyor in said chamber inclined from said entrance side to said exit side thereof and provided with means for temporarily immobilizing a receptacle rolling along said conveyor during sterilization of the articles contained therein while said receptacle is confined in said chamber;

an input roller conveyor inclined downwardly toward said entrance side for delivering said receptacles in succession to the roller conveyor within said chamber;

arresting means along said input conveyor coupled with said door at said entrance side and operable for engagement with the successive receptacles passing downwardly along said input conveyor for alternately stopping said receptacles in the closed position of the door at said entrance side and releasing said receptacles to admit them to said chamber in an open position of said at said entrance side;

and further conveyor means at said exit side of said chamber for removing the receptacles successively therefrom upon alternate opening and closing of the door at said exit side.

2. An apparatus as defined in claim 1 wherein said arresting means includes a lever underlying said input conveyor and fulcrumed at an intermediate location along the lever, said lever having a lower projection proximal to said entrance side of said chamber and an upper projection remote therefrom extending upwardly from said lever for alternate engagement with said receptacles to immobilize them successively at an upper portion of said input conveyor in an open position of the door at the entrance side of said chamber upon admission of a prior receptacle into said chamber and thereafter releasing the temporarily immobilized receptacles and reengaging them proximally to said chamber upon closure of the door at said entrance side, said lever having a further projection engageable with said door at said entrance side upon the movement thereof between its open and closed positions.

3. An apparatus as defined in claim 2 wherein said further conveyor means is a roller conveyor and all of said conveyors lie in a common inclined plane.

References Cited

UNITED STATES PATENTS

| 1,492,178 | 4/1924 | Nicholas | 198—34 X |
| 2,978,237 | 4/1961 | Frank | 214—118 X |
| 3,104,749 | 9/1963 | Sullivan | 193—35 |

JAMES H. TAYMAN, JR., *Primary Examiner.*